United States Patent Office 2,719,074
Patented Sept. 27, 1955

2,719,074

PROCESS FOR THE PREPARATION OF FERROUS CHLORIDE

Neal Orin Brace, Woodstown, N. J., assignor to E. I. du Pont de Nemours and Company, Wilmington, Del., a corporation of Delaware No Drawing. Application December 23, 1953,
Serial No. 400,105

2 Claims. (Cl. 23—87)

This invention relates to a new chemical process and more particularly to a new process for the preparation of essentially pure anhydrous ferrous chloride.

Ferrous chloride is available as its hydrate from several laboratory supply houses, but it is not available commercially in its anhydrous form. It is known to prepare the anhydrous salt by several laboratory methods, but these methods are not satisfactory from a commercial standpoint. For example, F. Wohler was able to prepare anhydrous ferrous chloride by hydrogen reduction of the ferric salt by a method which demands extremely careful control, so that the ferrous salt is not further reduced to metal. Another method depends upon expensive electricity being passed through an ethereal ferric chloride solution, the ferrous salt being generated at the cathode. Metallic iron can be heated at red heat in the presence of chlorine, ammonium chloride, or dry hydrogen chloride to produce ferrous chloride, but this method, obviously requires a high cost power input. Still another method for preparing anhydrous ferrous chloride depends upon dissolving the hydrate in an ammonium chloride solution, evaporating to dryness and then heating the residue in the absence of air, the water and ammonia escaping, leaving the anhydrous salt behind. This method is commercially unsatisfactory because of the high power input required for the evaporation step.

Anhydrous ferrous chloride is useful for the preparation of dicyclopentadienyliron, a new organoiron compound which is disclosed and claimed in the copending application of Pauson, U. S. Serial No. 291,567, filed June 3, 1952, now U. S. Patent No. 2,680,756, issued June 8, 1954.

This invention has as an object a novel process for the preparation of anhydrous ferrous chloride. A further object is to provide a process which is essentially quantitative for the preparation of essentially pure ferrous chloride by the reduction of ferric chloride. A still further object is to provide a process for the preparation of essentially pure anhydrous ferrous chloride which can readily be handled on a commercial scale. Other objects will appear hereinafter.

These objects are accomplished by the following process which consists of refluxing anyhdrous ferric chloride in an excess over the stoichiometric amount of chlorobenzene and filtering off the anhydrous ferrous chloride thus produced. As generally practiced, the process is carried out in a rather simple manner. The reaction vessel is charged with ferric chloride and the excess over the stoichiometric amount of monochlorobenzene, brought to reflux, and held on temperature until the HCl evolution has ceased. After cooling to a convenient temperature, the coarse, hexagonal crystals are filtered off. If desired, the crystals may be washed with an organic solvent and dried under reduced pressure.

The following examples will better illustrate the nature of the present invention; however, the invention is not intended to be limited to these examples.

*Example I*

A charge of 225 g. of monochlorobenzene (2 moles) and 162 g. of anhydrous ferric chloride (1 mole) was placed in a 4-necked, one liter, round bottom flask equipped with glass-ground paddle stirrer, thermometer and spiral reflux condenser connected through a safety trap to a tube immersed in a phenolphthalein indicator solution (which was titrated with standard 2-N sodium hydroxide solution as the hydrogen chloride was evolved). The black slurry was stirred at a rapid rate and heated in the course of thirty minutes to 126° C. (internal temperature) at which point the mixture became very thick and 1.2 cc. of 2-N alkali had been used up. The reaction proceeded at good velocity at 128–139° C. for two hours. The reaction mass had changed to a light tan and was appreciably smoother than when reaction first began. A total of 253 cc. of 2-N sodium hydroxide solution was required for titration or 100 per cent of theory for the reaction.

The liquid was separated from the solid on a Büchner funnel by suction filtration and the solid washed with about 200 cc. chloroform and pressed dry.

Analysis of the product showed:

Found/calc. per cent Fe=40.14/44.0
Found/calc. per cent Cl=54.24/56.0

*Example II*

A charge of 1400 g. of monochlorobenzene (12.4 mols) and 730 g. of anhydrous ferric chloride (4.5 mols) was heated to 130–140° C. for 2 hours. By that time the hydrogen chloride evolution had practically ceased and anhydrous ferrous chloride had separated as coarse, hexagonal plates.

The charge was cooled to below 50° C. and the crystals were filtered and washed with benzene. Upon drying at about 50° C. under a reduced pressure of about 30 mm. mercury, 566 g. of anhydrous ferrous chloride was obtained, which corresponds to a yield of 98.8%.

This crystalline anhydrous ferrous chloride was much less hygroscopic than ferric chloride. However, on exposure to the air for several days it changed to a tetrahydrate which was not deliquescent.

*Example III*

A charge of 253 g. of monochlorobenzene (2.25 mols) and 123 g. of anhydrous ferric chloride (0.75 mol) was placed in a 500 cc. flask fitted with an air condenser protected with a calcium chloride tube. The charge was heated to 130° C. in about 30 minutes and agitated at 130–140° C. for 2 to 3 hours. The hydrogen chloride evolution had practically stopped after that time and the ferrous chloride had precipitated as fine crystals.

After cooling to room temperature, the ferrous chloride was filtered off and washed with 200 cc. of benzene. The filter cake, wet with benzene and which weighed 123 g., was used to prepare dicyclopentadienyliron as described in copending U. S. application of Hobbs, U. S. Serial No. 312,658, filed October 1, 1952.

The excess of monochlorobenzene needed in the reaction requires as a minimum an excess of monochlorobenzene over the stoichiometric amount of one mole of monochlorobenzene to two moles of ferric chloride. No specific excess over this minimum amount of monochlorobenzene is required as long as an amount sufficient to provide a slurry which can be readily handled and from which the essentially pure anhydrous ferrous chloride can be conveniently isolated is utilized.

The ferric chloride used in the reaction is commercially available, but if light colored ferrous chloride is desired the ferric chloride must be of good quality. The reaction occurs just as readily with less pure material, but then the ferrous chloride obtained may vary in color, being at times a light reddish brown. This colored ferrous chloride is still quite satisfactory, however, for use in the manufacture of dicyclopentadienyliron.

The chlorobenzene used in this process is conventional monochlorobenzene obtained by the chlorination of benzene and subsequent isolation by distillation. The action of the ferric chloride on the chlorobenzene produces dichlorobenzene, most of which is the para isomer. This p-dichlorobenzene is a well-known article of commerce and may be separated from the excess monochlorobenzene and sold to the trade. Thus, the process has the additional advantage of yielding a valuable by-product.

As many apparently widely different embodiments of this invention may be made without departing from the spirit and scope thereof, it is to be understood that this invention is not limited to the specific embodiments thereof except as defined in the appended claims.

What is claimed is:

1. A process for the preparation of ferrous chloride which comprises heating a slurry of ferric chloride in an excess of 1 mole of chlorobenzene to 2 moles of ferric chloride until the evolution of hydrogen chloride ceases and isolating the ferrous chloride.

2. A process for the preparation of essentially pure anhydrous ferrous chloride which comprises heating a slurry of anhydrous ferric chloride in an excess of 1 mole of monochlorobenzene to 2 moles of ferric chloride to a temperature of about 120° to 140° C. until the evolution of hydrogen chloride ceases and isolating the ferrous chloride thus produced.

References Cited in the file of this patent

UNITED STATES PATENTS

| | | |
|---|---|---|
| 1,180,964 | Augur | Apr. 25, 1916 |
| 1,754,656 | Strosacker | Apr. 15, 1930 |
| 1,923,419 | Britton | Aug. 22, 1933 |
| 1,934,675 | Mills | Nov. 7, 1933 |
| 2,527,606 | Webb | Oct. 31, 1950 |